United States Patent [19]

Phoenix et al.

[11] Patent Number: 5,361,736
[45] Date of Patent: Nov. 8, 1994

[54] VARIABLE VALVE TIMING

[76] Inventors: Lancelot Phoenix; John B. Phoenix, both of 92 Leopold Avenue, Handsworth Wood, Birmingham, both of England, B20 1ET

[21] Appl. No.: 166,900
[22] PCT Filed: Jul. 4, 1991
[86] PCT No.: PCT/GB91/01094
§ 371 Date: Jan. 5, 1993
§ 102(e) Date: Jan. 5, 1993
[87] PCT Pub. No.: WO92/01144
PCT Pub. Date: Jan. 23, 1992

Related U.S. Application Data

[63] Continuation of Ser. No. 961,671, Jan. 5, 1993, abandoned.

[30] Foreign Application Priority Data

Jul. 13, 1990 [GB] United Kingdom ............... 9015461

[51] Int. Cl.$^5$ .......................... F01L 1/34; F16D 3/10
[52] U.S. Cl. .................. 123/90.17; 123/90.31; 74/568 R; 464/1
[58] Field of Search ........... 123/90.15, 90.17, 90.31; 74/567, 568 R; 464/1, 2, 160

[56] References Cited

U.S. PATENT DOCUMENTS

| 1,757,046 | 5/1930 | Horine | 123/90.17 |
|---|---|---|---|
| 4,305,352 | 12/1981 | Oshima et al. | 123/90.15 |
| 4,498,352 | 2/1985 | Hedelin | 123/90.17 |
| 4,694,789 | 9/1987 | Frost | 123/90.17 |
| 4,747,375 | 5/1988 | Williams | 123/90.15 |
| 4,917,058 | 4/1990 | Nelson et al. | 123/90.17 |
| 5,105,679 | 4/1992 | Voigt | 123/90.17 |
| 5,136,887 | 8/1992 | Elrod et al. | 123/90.17 |

FOREIGN PATENT DOCUMENTS

| 0063038 | 10/1982 | European Pat. Off. |
|---|---|---|
| 3234640 | 3/1984 | Germany |
| 3631733 | 3/1988 | Germany |
| 3842267A1 | 6/1990 | Germany |
| 2096695 | 1/1982 | United Kingdom |
| 2202001 | 9/1988 | United Kingdom |
| 2209061 | 4/1989 | United Kingdom |

OTHER PUBLICATIONS

C. Gray; A Review of Variable Engine Valve; SAE Technical Paper Series; Internation Congress and Exposition Feb. 29–Mar. 4, 1988; p. 7; FIG. 10.

T. Dresner & P. Barkan; A Review and Classification of Variable Valve Timing Mechanisms; International Congress & Exposition Feb. 27–Mar. 3, 1989; pp. 5, 6, 11 & 12.

Proceedings of the Institution of Mechanical Engineers, vol. 186, No. 23, 1972, London pp. 301–306; G. E. Roe: Variable Valve-Timing Unit Suitable . . . .

*Primary Examiner*—E. Rollins Cross
*Assistant Examiner*—Weilun Lo
*Attorney, Agent, or Firm*—Nixon & Vanderhye

[57] ABSTRACT

A means of varying both the opening and closing angle of internal combustion engine valves by means of a mechanism which varies the instantaneous phase of the camshaft with respect to the phase of the crankshaft so causing the cam to spend a longer or shorter time than nominal in contact with the valve tappet in response to a chosen control programme.

12 Claims, 5 Drawing Sheets

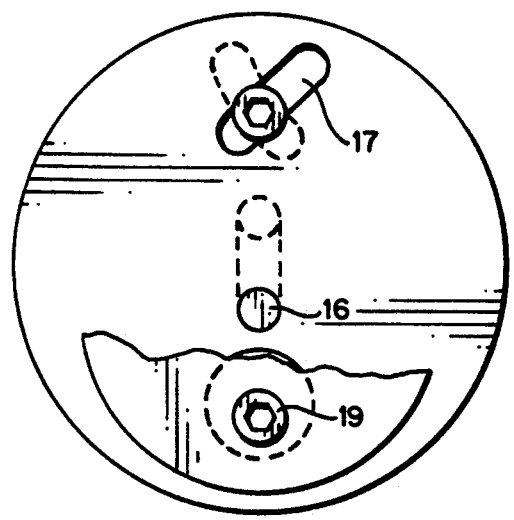
FIG. 8
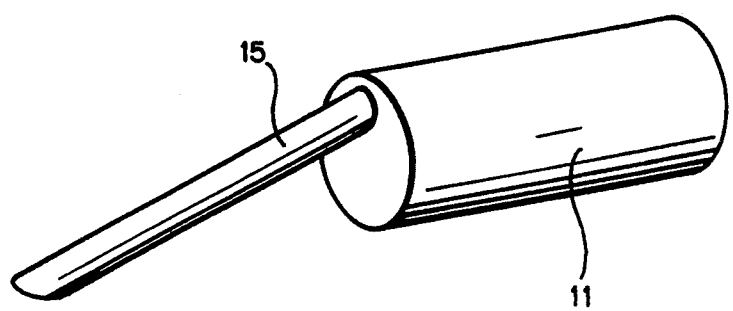
FIG. 9
FIG. 10
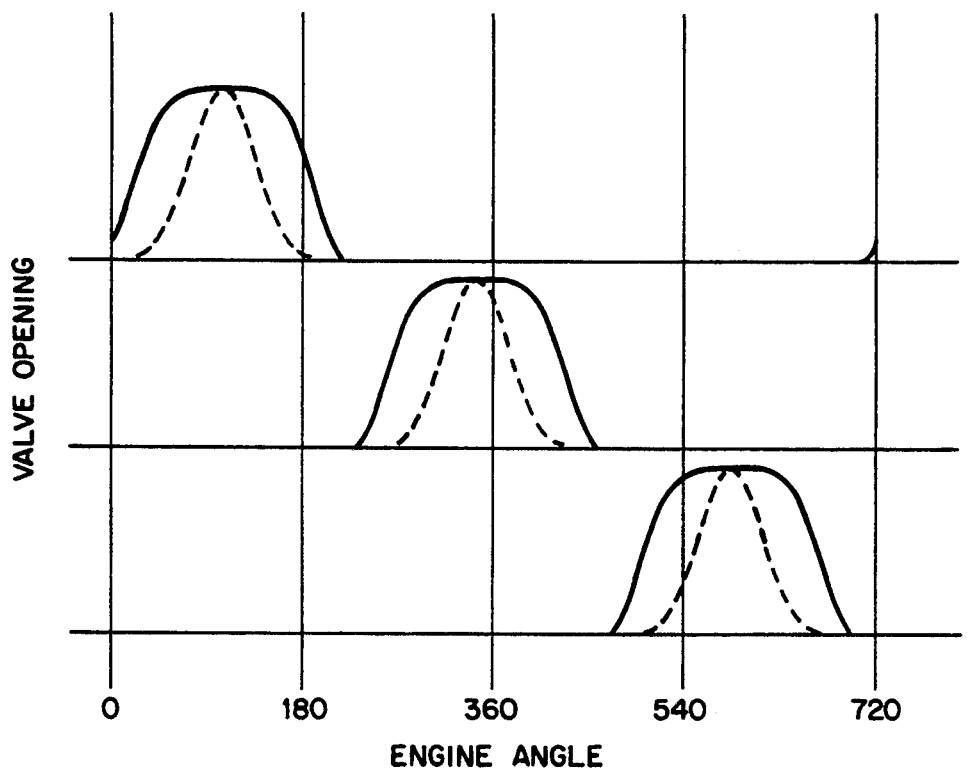

VARIABLE VALVE TIMING

This is a continuation-in-part of application Ser. No. 07/961,671, filed Jan. 5, 1993, now abandoned.

BACKGROUND OF THE INVENTION

1. Field of the Invention

This invention relates to variable valve timing for an internal combustion engine.

2. Discussion of Prior Art

In an internal combustion engine of the four-stroke (Otto cycle) type the phase of the engine cycle during which the inlet and exhaust valves are open is usually referred to as valve timing and is quoted as the opening and closing angles for both the inlet and exhaust valves before or after the point at which the piston reaches "top dead centre" (TDC) or "bottom dead centre" (BDC). In a conventional engine these angles are fixed and do not vary over the entire engine speed and load range.

The fixed valve timing is a compromise setting over most of the engine operating range because the dynamic behaviour of the gas-flows in the cylinder and through the valves varies considerably over the entire range. For this reason the fixed valve timing can only be correct for some required engine performance characteristic (e.g. minimum exhaust emissions, maximum power, lowest fuel consumption) at one particular engine speed and load situation and over the rest of the range poorer performance must be accepted.

This behaviour of the fixed-valve-timing internal combustion engine has been known almost since its invention but the simplicity of fixed valve timing has led to its retention with individual engine designs being a compromise aimed at some particular performance characteristic in which some desirable characteristics are sacrificed for others; for example an engine design might aim for high output power at high speed at the expense of low speed tractability.

There is a great deal of published information and patents on means of varying the valve timing of an engine. Some of these are concerned with altering the phase of the camshaft with respect to the crankshaft but these suffer the disadvantage that advancing or retarding the opening of a valve has the same effect on the closing of that valve. For example advancing the opening of an inlet valve to increase the overlap with the exhaust valve for better cylinder scavenging at higher engine speeds results in that inlet valve closing earlier so limiting the fuel charge available.

SUMMARY OF THE INVENTION

According to the present invention there is provided a system for controlling the opening and closing of the inlet and/or exhaust valves of an internal combustion engine having one or more cylinders said system including means of controlling in a variable manner the rotational phase of the valve operating means with respect to the phase of the engine output shaft such that the instantaneous phase of the valve operating means changes in a predetermined cycle of advance and retard about some nominal value during any one complete cycle of one valve operation and in which system the amplitude of said phase change may be altered whilst the engine is operating so permitting a change in the valve open-time or phase of opening for any given engine speed and said system including means of ensuring that only one valve opening is affected by any one cycle of advance and retard of the valve operating means characterized by the valve operating means being divided into appropriate sections such that the number of valves controlled and the phase relationship between sequential operations of the valves controlled by any one section ensures that there is no overlap in sequential valve operations on any section of the valve operating means.

BRIEF DESCRIPTION OF THE DRAWINGS

The accompanying

FIGS. 3 to 9 inclusive show various details of mechanisms applying to the invention;

FIG. 10 shows a computer generated graph of the operation of the particular example;

DETAIL DISCUSSION OF PREFERRED EMBODIMENTS

Figure 1:
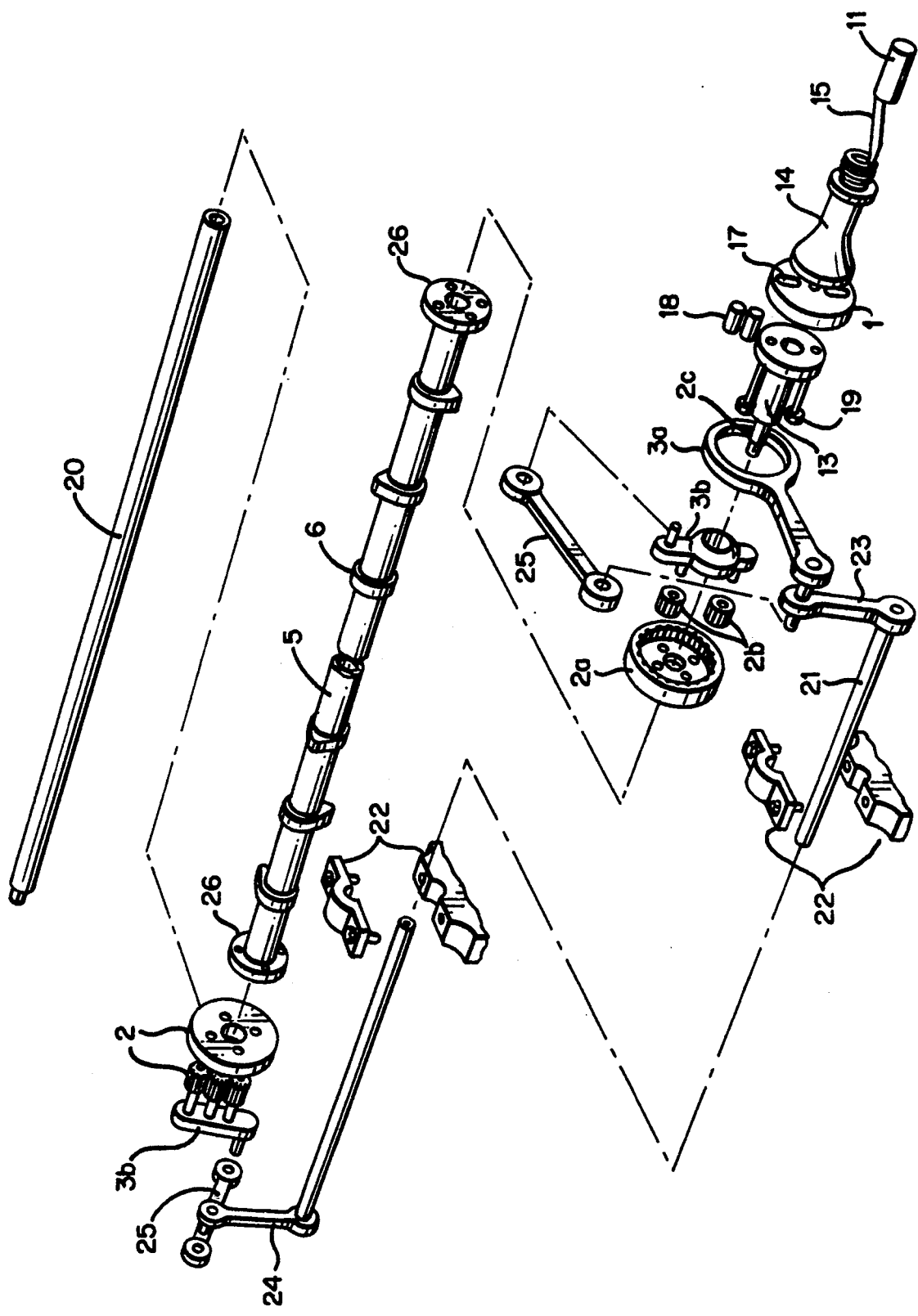
FIG. 1, shows a particular example of the invention.

FIG. 1 shows an example of the invention as applied to a straight-six double overhead camshaft engine and shows a means of varying both the opening and closing angle of the valves by means of a mechanism which varies the instantaneous phase of the camshaft with respect to the crankshaft so causing the cam to spend a longer or shorter time than normal in contact with the valve tappet. The operation of the invention as applied to a six cylinder camshaft will first be explained by reference to the simple model shown in FIG. 2.

Figure 2:
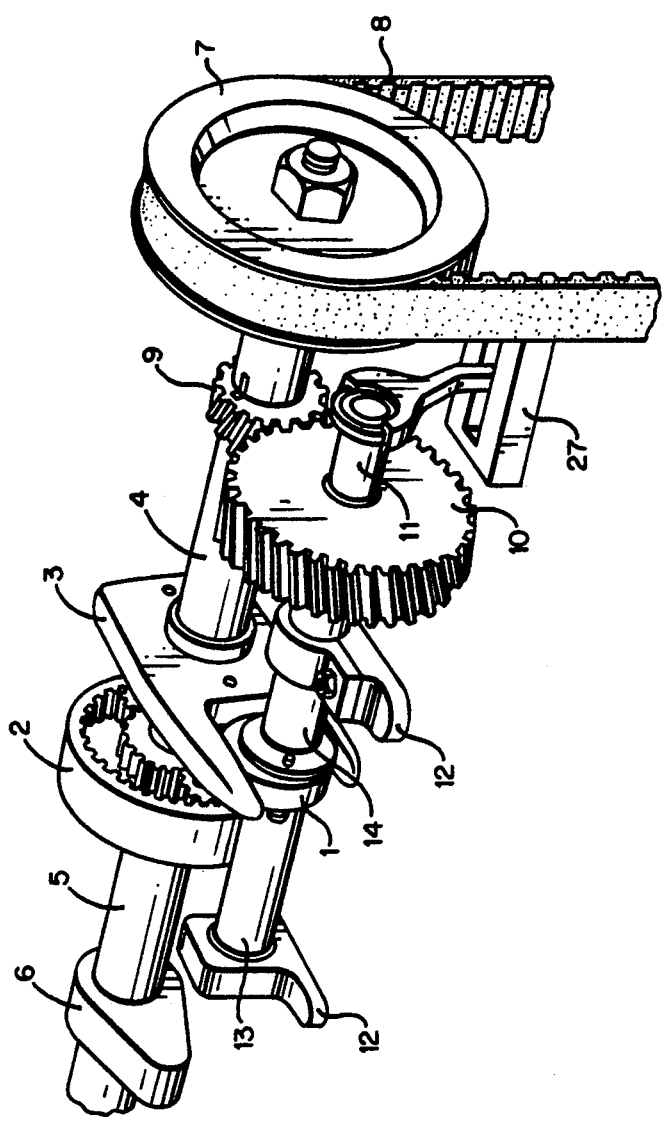
FIG. 2 shows a simplified model for the purposes of explanation of the invention.

In FIG. 2 a variable eccentric 1 engages with a differential-gear reaction-member 3 so that rotation of the eccentric 1 causes the reaction-member 3 to rock about input shaft 4. The planetary gears in the epicyclic differential 2 are carried on shafts protruding from the reaction-member 3. The sun gear of the differential 2 is driven by the input shaft 4 which passes through a bearing in the reaction-member 3. Rotation of the sun gear with the input shaft 4 causes the annulus of the differential 2 to rotate in the opposite sense to the input shaft 4 at a speed ratio depending upon the number of teeth on the sun wheel and the annulus; in this case 1:2. The annulus of the differential 2 is attached to the camshaft 5 on which is mounted cam 6. The mean speed of rotation of the cam 6 therefore is half that of the input shaft 4 and in the opposite sense. However, the reaction provided by the planetary gears which permits the drive to be transmitted from the sun wheel to the annulus is not stationary with respect to the engine block but is oscillating about the input shaft 4 and therefore the speed of the cam 6 varies about the mean speed in sympathy with the reaction-member 3.

The cam 6, therefore, is sometimes lagging in phase with respect to where it would be if driven directly by a conventional input shaft and sometimes leading in phase with respect to where it would be if driven directly by a conventional input shaft which would normally be driven directly by the crankshaft.

The amplitude of the phase change experienced by cam 6 can be varied by virtue of the variable eccentric 1 imparting a greater or lesser amplitude of oscillation to the reaction-member 3. Because the differential 2 in the simplified model shown in FIG. 2 has a ratio of 1:2, the eccentric 1 must also be driven at a ratio of 1:2 with respect to the input shaft 4. The gear 9 mounted on input shaft 4 which is driven by the drive belt 8 through the pulley 7 at crankshaft speed meshes with gear 10 which has twice the number of teeth as gear 9 and, therefore, rotates at half crankshaft speed. Eccentric 1 which is driven by shaft 14 to which gear 10 is keyed therefore also rotates at half crankshaft speed. This means that the eccentric 1 completes one revolution for each complete revolution of cam 6.

It can now be seen that for each position of cam 6 the reaction-member 3, driven by eccentric 1, will be at the same phase of its oscillation and, therefore, the cam will be advanced or retarded with respect to a conventional cam by an angular amplitude that depends on the eccentricity of eccentric 1.

The eccentricity of eccentric 1 is adjusted by sliding member 11 in or out of hollow shaft 14 which in conjunction with hollow shaft 13 supported on bearings 12 support the eccentric 1.

Figure 3:
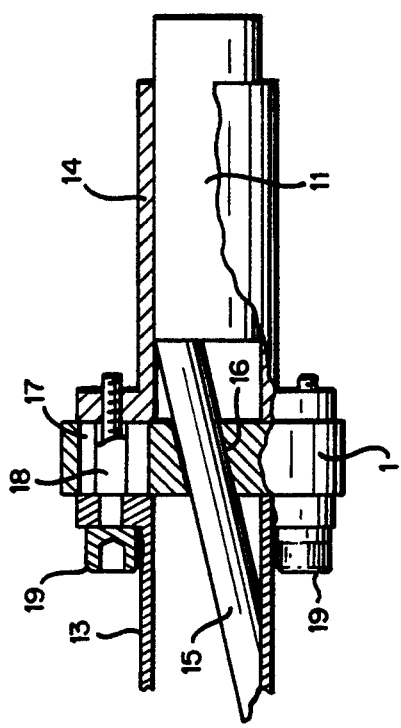

FIG. 3 shows the operation of the variable eccentric 1. In FIG. 3 variable eccentric 1 is freely clamped between shafts 13 and 14 by means of the bolts 19 passing through flanges on the ends of shafts 13 and 14. The flanges are spaced by tubular spacers 18 whose length is slightly greater than the thickness of eccentric 1. The bolts 19 and spacers 18 pass through slots 17 in eccentric 1 so that eccentric 1 is constrained rotationally but able to slide from side to side between the flanges within the limits of the length of the slots 17. Cylindrical member 11 has a cylindrical member 15 projecting at an angle from one end. Member 15 passes through a hole 16 drilled at an angle through eccentric 1 such that when member 11 slides within hollow shaft 14, to the left or right in FIG. 3, eccentric 1 moves up or down.

Returning to FIG. 2 the member 11 is moved in or out of the hollow shaft by an actuator 27 of known type, for example a stepper-motor driving a worm, so that operation of the actuator varies the amplitude of the phase changes to which cam 6 is subjected during any one revolution such that the cam can be arranged to spend a greater or lesser time in contact with the valve tappet and in this way hold the valve open for a greater or lesser part of the engine operation cycle in order to achieve some desired engine operating characteristic. The actuator is operated in response to a chosen control program.

The foregoing explanation of the simple model will facilitate understanding of FIG. 1. In the case of a six cylinder engine there are six inlet and six exhaust valve operations in an engine cycle, which occupies two revolutions of the crankshaft. Even in a double overhead camshaft engine this requires the cams on any one shaft to be so arranged that at certain times two cams are in contact with valve tappets such that when one cam is opening a valve, another cam is closing a valve. Shifting the instantaneous phase of such a camshaft so that the opening of one valve is advanced would also lead to the closing of another valve being advanced when it could be desirable for the closing of this other valve to be retarded. This therefore requires that the camshaft be divided so that this valve overlap operation does not occur.

In the exploded view shown in FIG. 1 the camshaft 5 is shown divided into two parts, each half being provided with its own differential 2 bolted to flanges 26 on each end of the split camshaft. This requires the drive to the reaction-members 3b to differ from the simple system described earlier. Eccentric follower 3a is a yoke completely encircling eccentric 1 and being attached to the reaction-members 3b through a linkage comprising connecting rods 25 and a transfer shaft 21 mounted in bearings 22 and levers 23 and 24 which are attached to each end of the transfer shaft.

It can be seen in operation that the eccentric follower 3a operates on lever 23 to cause the transfer shaft 21 to oscillate through an angle, the amplitude of which is determined by the eccentricity of eccentric 1. Reaction-members 3b are connected to the levers 23 and 24 through connecting rods 25 such that angular oscillation of shaft 21 causes the reaction-members 3b to oscillate.

Considering the operation of one half of the camshaft 5; because three cams 6 are mounted on this shaft, three cycles of advance and retard are required for each revolution of the shaft and this requires the eccentric to run at three times mean camshaft speed. The differential 2a,b,c in this case is therefore arranged to have a gear ratio of 1:3. This of course applies to both of the differentials 2. Operation of the valves takes place at regular and equal intervals and alternates between the two halves of the split camshaft 5. This means that when a cam 6 on one half of the camshaft 5 is causing a valve to open, a cam 6 on the other half of the camshaft 5 will be causing a valve to close. It can be desirable, both, to advance the opening of a valve and retard the closing and this requires that one half of the camshaft 5 must be advanced in phase and the other half, simultaneously, retarded. This is achieved by operating the reaction-members 3b in antiphase by arranging that one connecting rod 25 connected to lever 23 operates on a pin projecting from the top of the associated reaction-member 3b and the connecting rod 25 from lever 24 operates on a pin projecting from the bottom of its associated reaction-member 3b. Therefore, when viewed from one end of the camshaft 5, when one reaction-member is rotating clockwise, the other reaction-member is rotating anticlockwise.

The drive from the sun wheel 2c driven directly by shaft 13 at three times mean camshaft speed is transferred to the sun wheel at the other end of camshaft 5 by means of shaft 20 which runs through the centre of the camshaft 5.

Although only one camshaft is shown in FIG. 1 it has not been specified which camshaft this applies to and, of course, it can apply to either one or both the inlet and exhaust camshafts.

Figure 5:
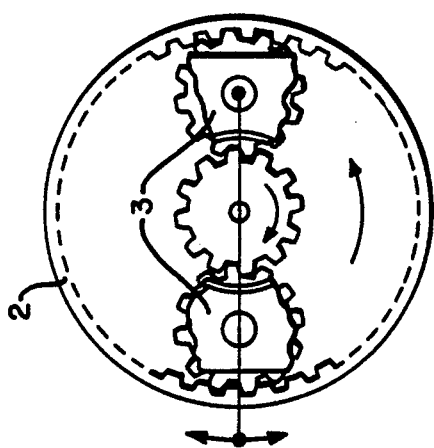
Figure 7:
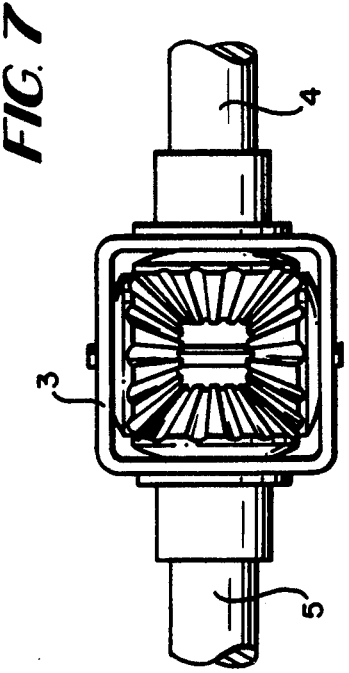
Figure 4:
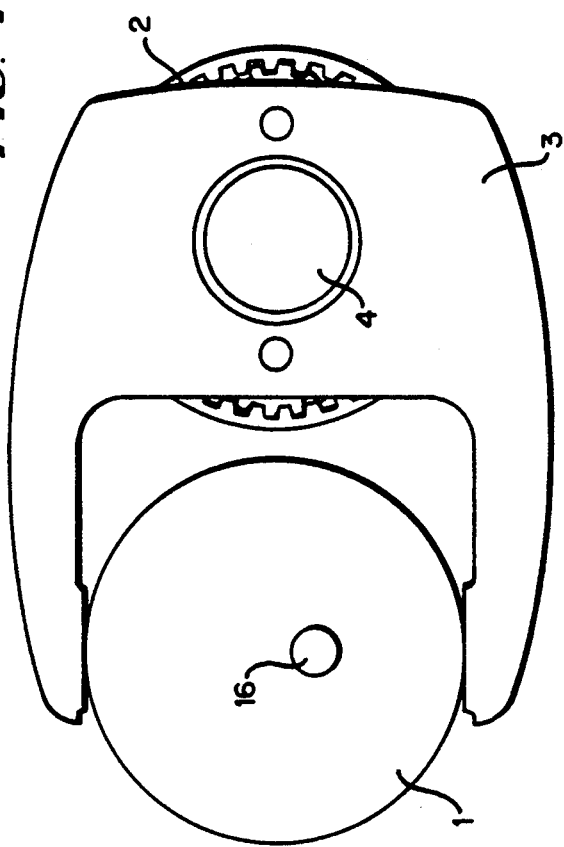
Figure 6:
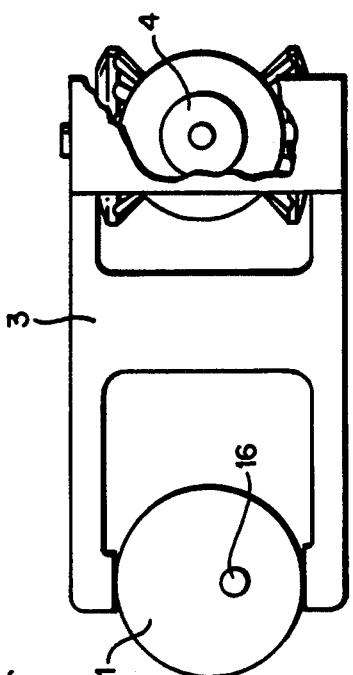

FIGS. 4 and 5 show in more detail the arrangement for driving the differential 2 shown in FIG. 2. FIGS. 6 and 7 show an alternative differential using bevel gears but this always has a 1:1 ratio.

FIG. 8 shows how it is possible to change the angular position of the eccentric 1 with respect to the input shaft 14 at the same time as changing the eccentricity in order to produce more complicated cam phasing arrangements and FIG. 9 shows a perspective view of the eccentric operating members 11 and 15.

FIG. 10 is a computer generated curve showing a practical range of variation in valve timing achievable with the particular example shown in FIG. 1.

Figure 11:
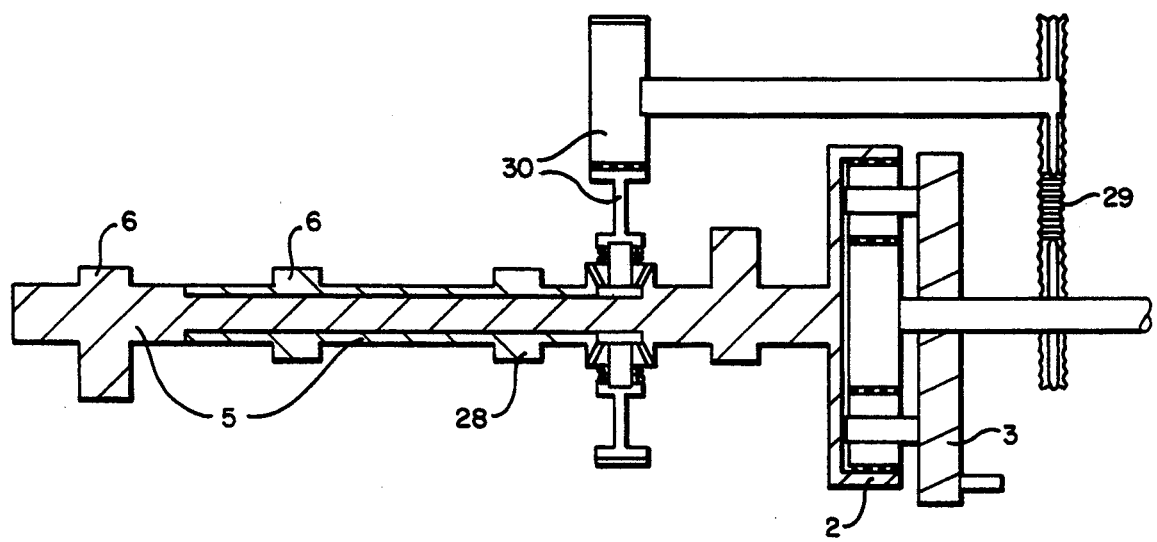
FIG. 11 shows one means of applying the invention to one camshaft of a four cylinder engine.

FIG. 11 shows a means of coupling the cams on each end of one split camshaft of a four cylinder engine by a shaft running through a hollow section of camshaft supporting the two center cams. A differential bevel gear 28 driven at mean camshaft speed by a 1:1 chain drive 29 and a 1:2 gear drive 30 arranges that the antiphase advance and retard requirement of the two sections of the camshaft (as explained for FIG. 1) is achieved through the differential-gear 28 because advancing or retarding the cams on the end of the camshaft with respect to mean camshaft position will retard or advance, respectively, the center section of the camshaft.

Figure 12:
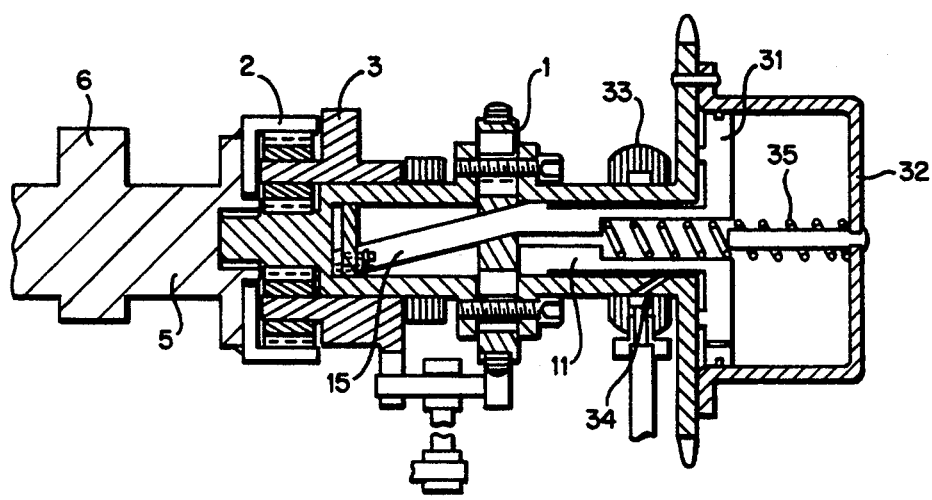
FIG. 12 shows a means of including a hydraulic actuator in a coaxial arrangement of the invention such as that shown in FIG. 1.

FIG. 12 shows a means of applying a hydraulic actuator to a coaxial version of the invention such as that shown in FIG. 1. The actuator applies force to the cylindrical member 11 by means of oil pressure applied to the piston 31 in cylinder 32 through the bearing 33 and holes 34 drilled in the hollow shaft 14. The oil pressure balances the piston against the force applied by the spring 35 in order to determine the axial position of the eccentric operating members 11 and 15.

It will of course be understood that many different means of obtaining variable amplitude oscillation, for example, variable swash plate or variable throw crank can be devised by one skilled in the art. Similarly different means of transmitting the variable amplitude oscillation to known mechanical phase-shifting devices, for example, hydraulic or electric means might be employed. The variable phasing described in the particular example shown in FIG. 1 could be applied to a single camshaft engine by means of complicated splitting of the inlet and exhaust functions of the camshaft.

We claim:

1. A system for the opening and closing at least one valve on an internal combustion engine, said engine having an output shaft and at least two cylinders, each of said at least two cylinders having at least one valve, said output shaft having a rotational phase, said system comprising:

a rotating valve operating means for opening and closing said valves associated with said cylinders, the opening and closing of a valve comprising one cycle of valve operation, said operating means having a rotational phase; and rotational phase control means for variably controlling rotational phase of said valve operating means to advance and retard about a nominal phase said valve operating means rotational phase with respect to the rotational phase of said engine output shaft during each cycle of valve operation, said rotational phase control means comprising a means for dividing said rotating valve operating means into at least two sections, each of said sections operating at least two valves, and for ensuring that there is no valve overlap between any of said valves in a section, where overlap is defined as at least two valves in one section at least partially open at the same time.

2. The system according to claim 1, wherein said rotating valve operating means comprises at least one camshaft, and said rotational phase control means comprises means for dividing said at least one camshaft into at least two camshaft sections.

3. The system according to claim 2, wherein said engine is an in line six cylinder engine with double overhead camshafts, one of said double overhead camshafts comprising said at least one camshaft divided into two camshaft sections and operating intake valves of said engine, each of said camshaft sections operating intake valves for three adjacent cylinders, and the other of said double overhead camshafts operating exhaust valves, said rotational phase control means further including means for advancing one of said camshaft sections while retarding the other of said camshaft sections.

4. The system according to claim 2, wherein said engine is an in line four cylinder engine with double overhead camshafts, having inner and outer pairs of cylinders, one of said double overhead camshafts comprising said at least one camshaft divided into two camshaft sections and operating intake valves of said engine, each of said camshaft sections operating intake valves for a respective pair of cylinders, and the other of said double overhead camshafts operating exhaust valves, said rotational phase control means further including means for advancing one of said camshaft sections while retarding the other of said camshaft sections.

5. The system according to claim 2, wherein said rotational phase control means includes at least one differential and at least one phase amplitude adjustment means, said at least one differential comprising:

a sun gear driven in a predetermined phase relationship with said engine output shaft;

at least one planetary gear mounted for rotation about an axis of said at least one planetary gear and for rotation about an axis of rotation of said sun gear, said at least one planetary gear interengaged for rotation with said sun gear; and a ring gear mounted for rotation in a predetermined phase relationship with one of said camshaft sections and driven by said at least one planetary gear:

and said at least one phase amplitude adjustment means comprising:

an adjustable amplitude eccentric rotationally driven in a predetermined phase relationship with said sun gear; and an eccentric follower, responsive to the rotational position of said eccentric, for rotationally advancing and retarding said at least one planetary gear around said sun gear.

6. The system according to claim 5, wherein said adjustable amplitude eccentric comprises:

an eccentric:

means for mounting said eccentric for rotation about an axis of rotation and for movement of said eccentric in a radial direction relative to said axis of rotation between a minimum and maximum amplitude eccentricity.

7. The system according to claim 6, wherein there are two differentials, one for each camshaft section, and said eccentric follower comprises:

yoke means for encircling said eccentric;

first linkage means for translating movement of said yoke means into rotational movement of said planetary gear of one of said differentials in one rotational direction; and second linkage means for translating movement of said yoke means into rotational movement of said planetary gear of the other of said differentials in second rotational direction, said second rotational direction is opposite to said first rotational direction.

8. The system according to claim 2, wherein said rotational phase control means includes at least one differential gear and at least one phase amplitude adjustment means, said at least one differential gear comprising:

a differential gear case;

an input gear mounted for rotation in said case and driven in a predetermined phase relationship with said engine output shaft;

at least one pinion gear mounted for rotation in said case, said at least one pinion gear interengaged for rotation with said input gear; and an output gear mounted for rotation in said case and in a predetermined phase relationship with one of said camshaft sections and driven by said at least one pinion gear; and said at least one phase amplitude adjustment means comprising:

an adjustable amplitude eccentric rotationally driven in a predetermined phase relationship with said input gear; and an eccentric follower, responsive to the rotational position of said eccentric, for rotationally advancing and retarding said case and said at least one pinion gear around said input gear.

9. The system according to claim 8, wherein said adjustable amplitude eccentric comprises:

an eccentric;

means for mounting said eccentric for rotation about an axis of rotation and for movement of said eccentric in a radial direction relative to said axis of rotation between a minimum and maximum amplitude eccentricity.

10. The system according to claim 9, wherein there are two differential gears, one for each camshaft section, and said eccentric follower comprises:

yoke means for encircling said eccentric;

first linkage means for translating movement of said yoke means into rotational movement of said gear case of one of said differential gears in one rotational direction; and second linkage means for translating movement of said yoke means into rotational movement of said gear case of the other of said differential gears in second rotational direction, said second rotational direction is opposite to said first rotational direction.

11. A system for controlling the opening and closing of at least one of an inlet and an exhaust valve of an internal combustion engine having at least one cylinder, a valve operating means and an engine output shaft, said system including:

means for variably controlling rotational phase or the valve operating means with respect to the phase of the engine output shaft and for changing the instantaneous phase of the valve operating means in a predetermined cycle of advance and retard about a nominal value during any one complete cycle of one valve operation;

means for changing the amplitude of said instantaneous phase change during engine operation and thereby changing at least one of the valve open-time and phase of opening for any given engine speed, said amplitude changing means comprising a means for superimposing a synchronously modulated phase change of positive and negative sign upon the valve operating means, said amplitude changing means comprises a variable eccentric mechanism, said mechanism including:

a disc mounted to the end of a hollow shaft, said disc slidably mounted for movement in a direction substantially radial to the shaft but constrained rotationally so that any rotation of the shaft causes rotation of the disc;

means, at least partially within the shaft, for determining the eccentricity of the disc with respect to the shaft, said eccentricity determining means comprising a member which is able to slide axially within the hollow shaft and has at an end nearest to the disc an attached member projecting at an angle with respect to a longitudinal axis of said shaft, such that this angularly projecting member has the characteristics of a ramp which fits through a hole in the disc such that axial movement of said slidable member produces a radial movement of the disc.

12. A system as claimed in claim 11, wherein said variable eccentric mechanism operates upon a linkage connected to said phase change mechanism interposed between the engine output shaft and the valve operating means in such a way that synchronous oscillatory motion of the variable eccentric linkage occurs when the shaft of the eccentric is rotated at some defined proportion of the engine speed and causes the phase change device to modulate the phase between the engine output shaft and the valve operating means in synchronism with each valve operation.

* * * * *